(No Model.)  6 Sheets—Sheet 1.

J. H. GOODFELLOW.
SAND BLAST APPARATUS FOR CLEANING STOVE PLATE CASTINGS.

No. 437,922. Patented Oct. 7, 1890.

Witnesses.
Geo. E. Miller
C. S. Goodfellow

Inventor
John H. Goodfellow

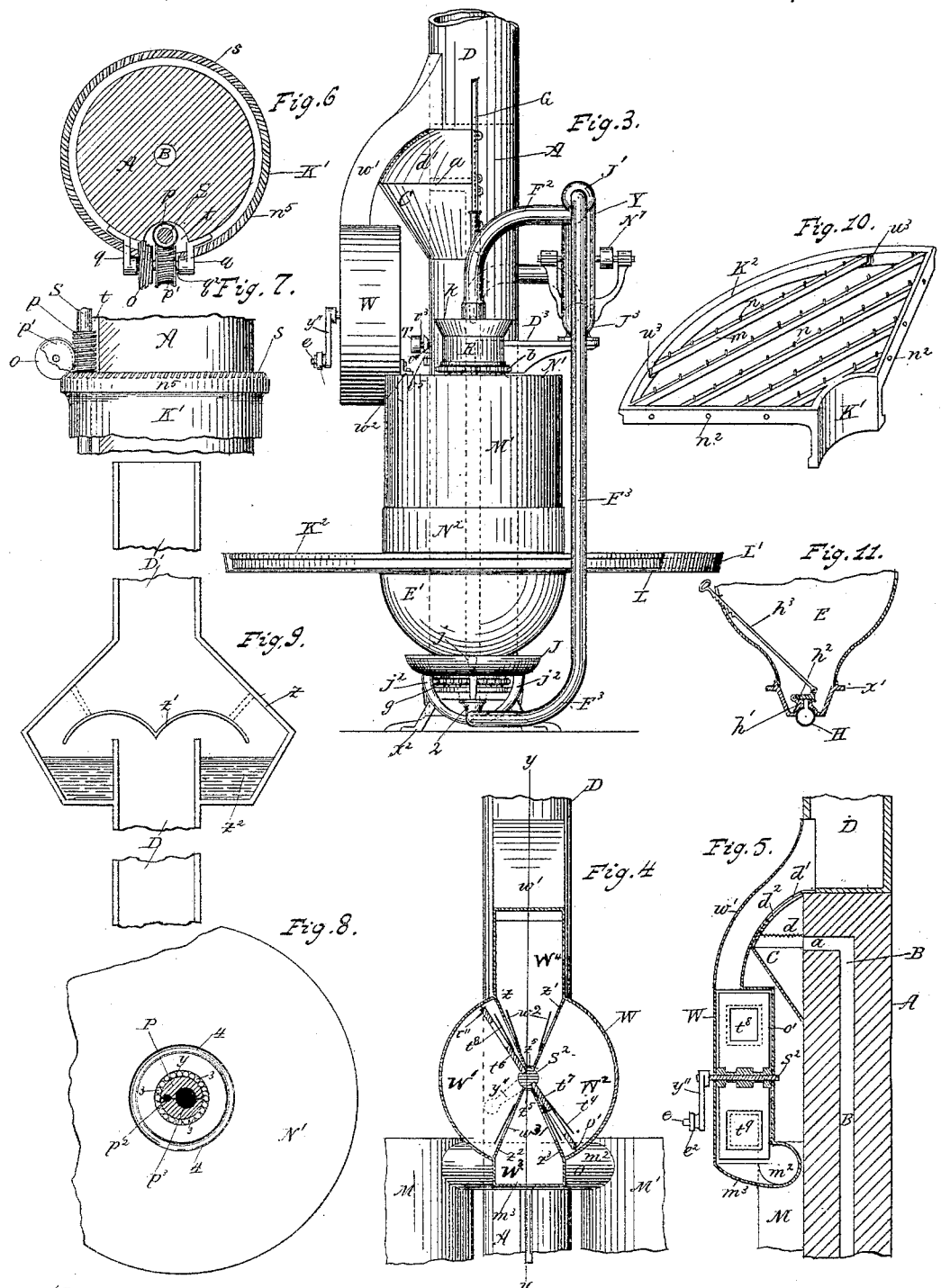

(No Model.)  6 Sheets—Sheet 4.

J. H. GOODFELLOW.
SAND BLAST APPARATUS FOR CLEANING STOVE PLATE CASTINGS.

No. 437,922.  Patented Oct. 7, 1890.

(No Model.) 6 Sheets—Sheet 5.

J. H. GOODFELLOW.
SAND BLAST APPARATUS FOR CLEANING STOVE PLATE CASTINGS.

No. 437,922. Patented Oct. 7, 1890.

Witnesses:
Henry Schlingloff
W. D. Schlingloff

John H. Goodfellow
Inventor
by his Attorney
Alex Selkirk (No Model.) 6 Sheets—Sheet 6.

J. H. GOODFELLOW.
SAND BLAST APPARATUS FOR CLEANING STOVE PLATE CASTINGS.

No. 437,922. Patented Oct. 7, 1890.

Witnesses:
J. M. Fowler Jr.
James G. Jester.

Inventor:
John H. Goodfellow
By J. R. Nottingham
Attorney.

UNITED STATES PATENT OFFICE.

JOHN H. GOODFELLOW, OF TROY, NEW YORK, ASSIGNOR OF TWO-THIRDS TO HIRAM G. HAMMETT AND E. SMITH STRAIT, BOTH OF SAME PLACE.

SAND-BLAST APPARATUS FOR CLEANING STOVE-PLATE CASTINGS.

SPECIFICATION forming part of Letters Patent No. 437,922, dated October 7, 1890.

Application filed July 28, 1886. Serial No. 209,292. (No model.)

*To all whom it may concern:*

Be it known that I, JOHN H. GOODFELLOW, a citizen of the United States, residing at Troy, in the county of Rensselaer and State of New York, have invented certain new and useful Improvements in Sand-Blast Apparatuses, of which the following is a specification.

My invention relates to sand-blast apparatuses for dressing, grinding, cutting, reducing, and abrading the surfaces of metal, glass, stone, pottery, and other hard or solid substances by the use of streams of sand; and it consists of the devices, parts, and elements, and combinations of devices hereinafter particularly described, and specifically set forth in the claims.

The objects of the invention are to provide certain improvements in that class of sand-blast machines in which the blast operates on both sides of the articles simultaneously. I attain these objects by the means illustrated in the accompanying drawings, forming a part of this specification, in which—

Figure 1:
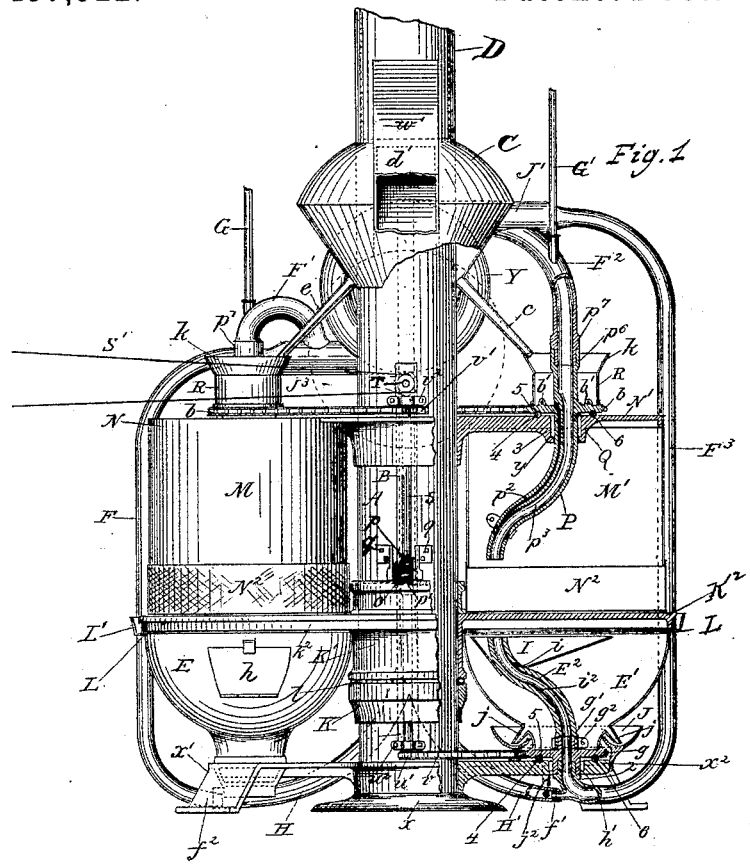
Figure 2:
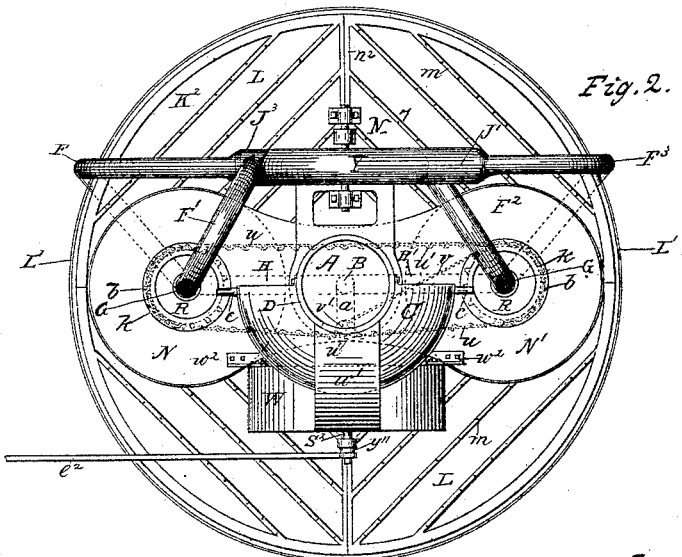
Figure 12:
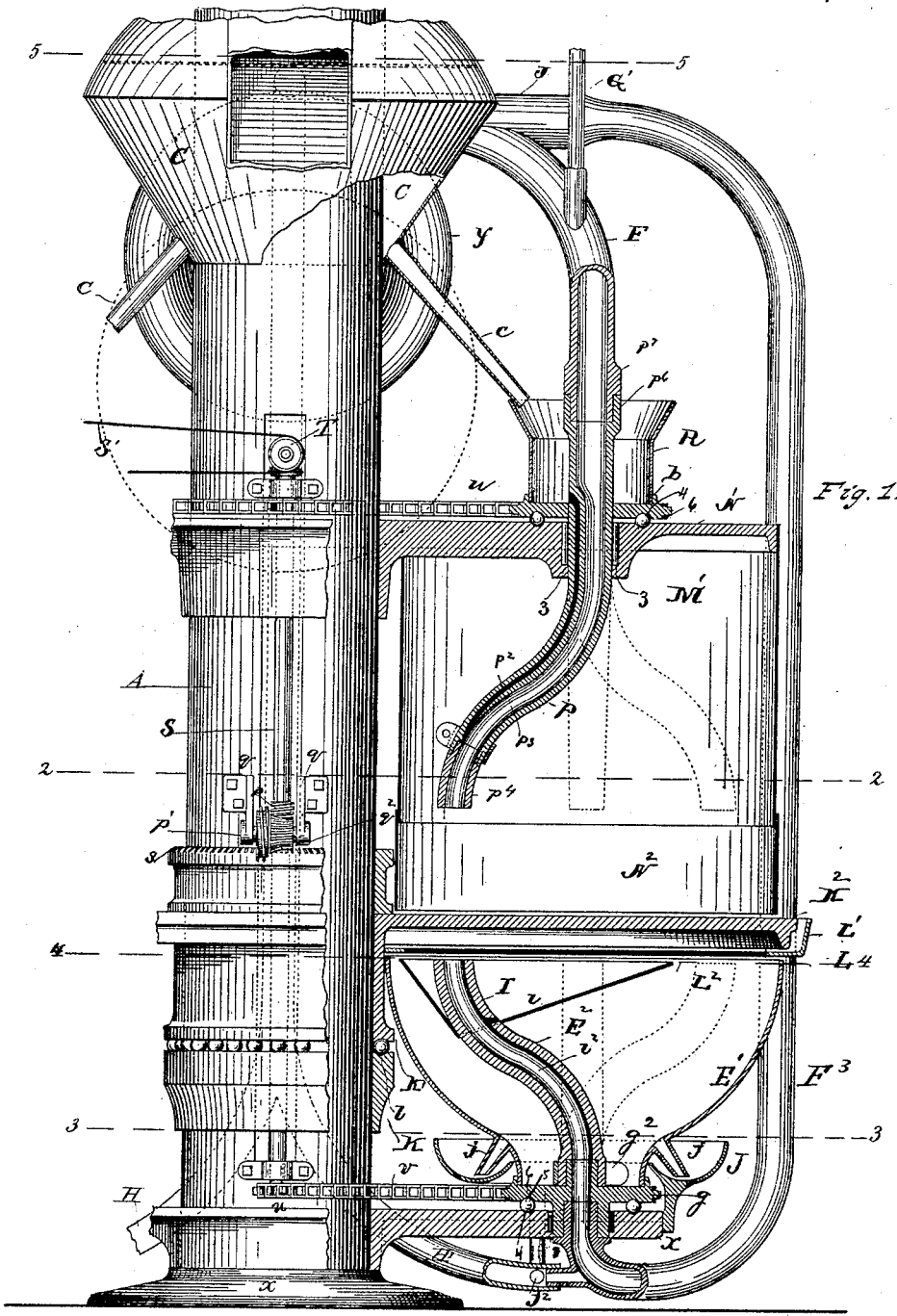
Figure 13:
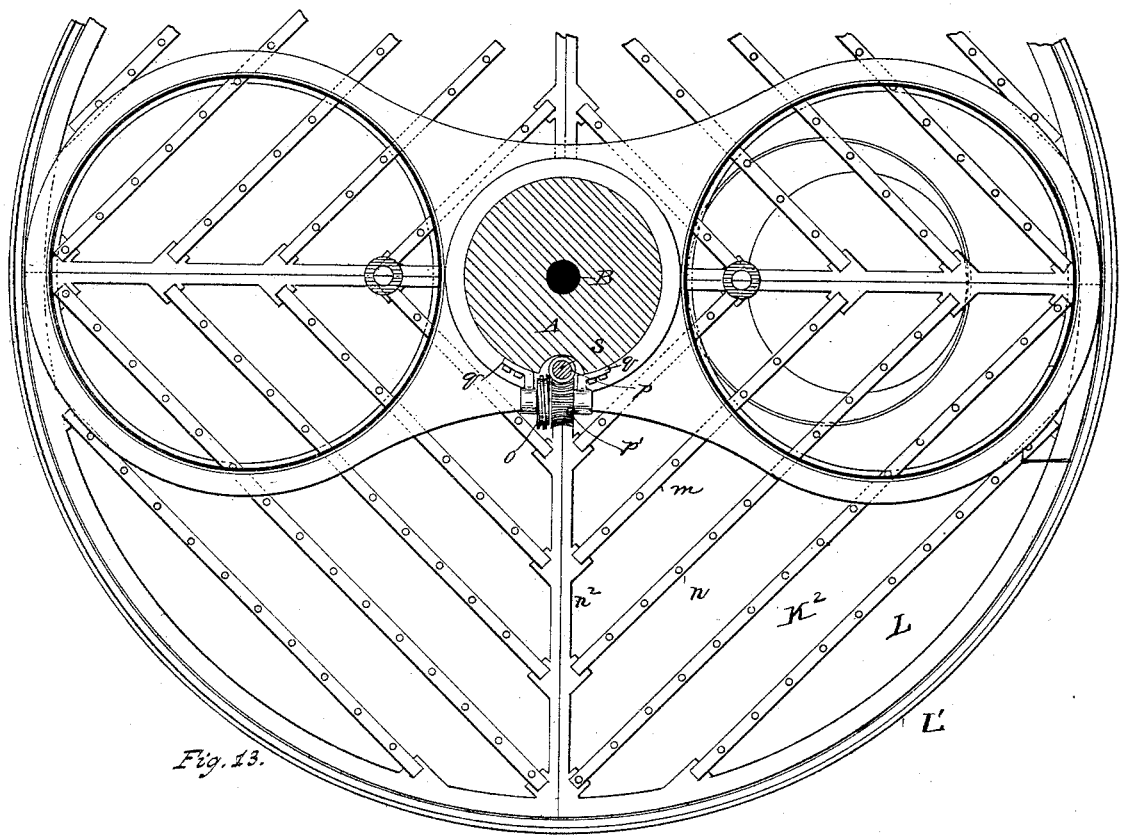
Figure 14:
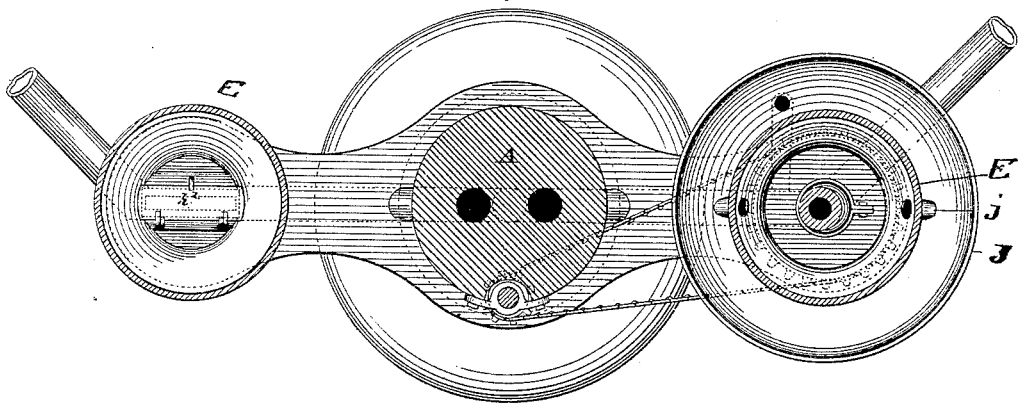
Figure 15:
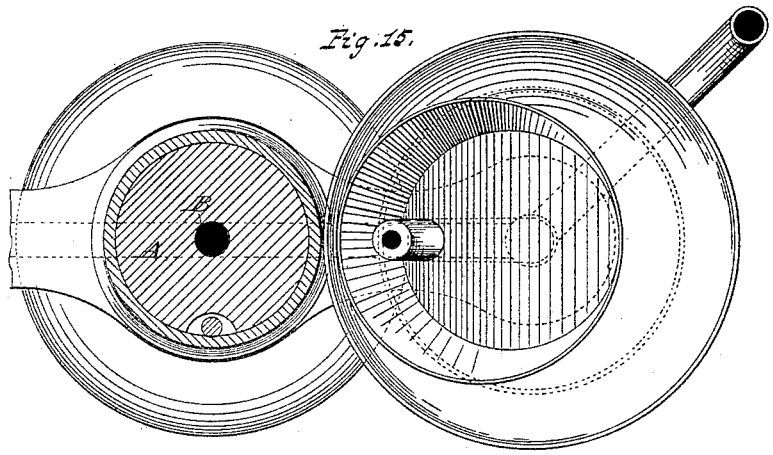
Figure 16:
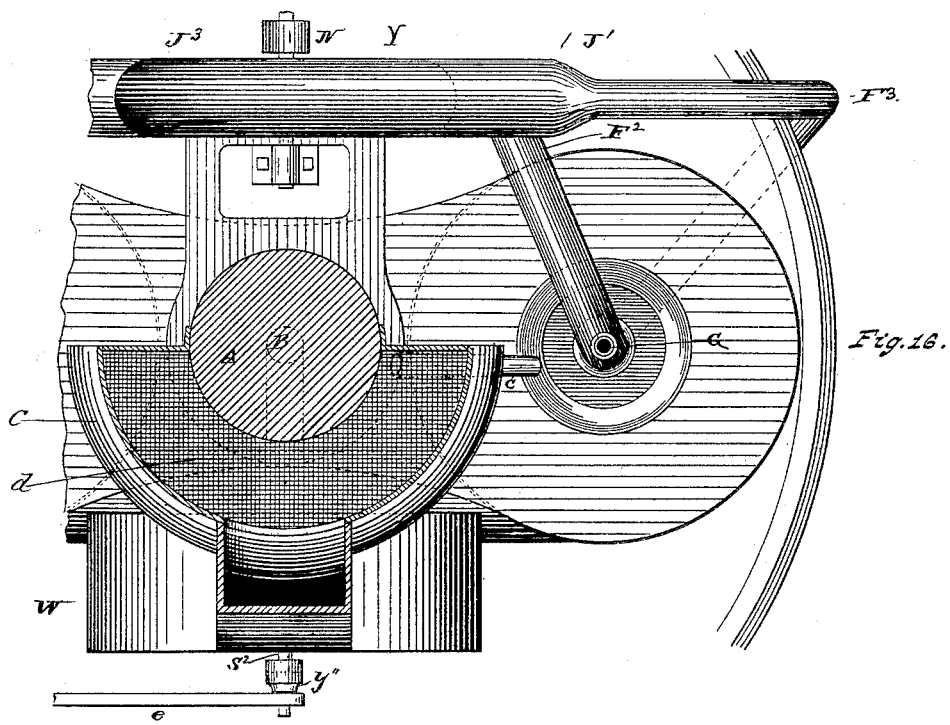
Figure 17:
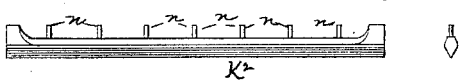
Figure 18:
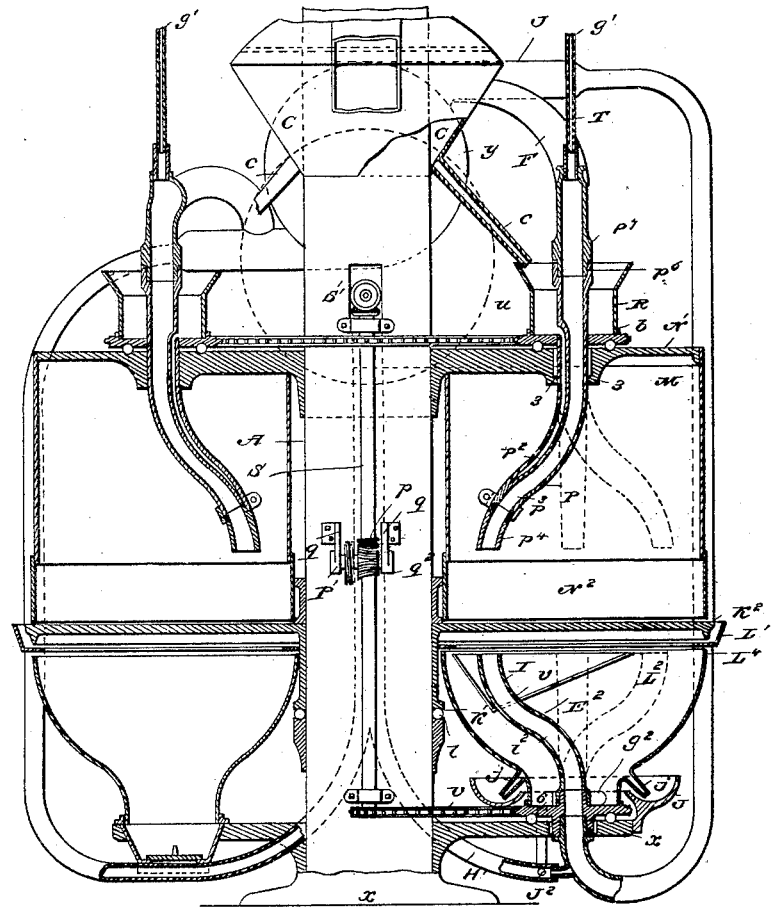

Figure 1 is a view of my improved apparatus with the dust-cleaning devices removed and with a part shown in front elevation and a part shown in section. Fig. 2 is a view of the apparatus from above the sand-supply chamber. Fig. 3 is a side elevation of the same. Fig. 4 is a sectional view of the upper portion of Fig. 3. Fig. 5 is a sectional view taken at line $y$ in Fig. 4. Fig. 6 is a sectional view taken at about the plane with the upper end of the worm of the worm-gear shown in Fig. 7. Fig. 7 is a side view of the worm-gear at the central column of the apparatus, employed to give motion to several parts of the same. Fig. 8 is a plan view of a bracket containing the journal and bearing of my revolving sand-blast pipes, and illustrating the groove for the anti-friction balls and the arrangement of the anti-friction cylinders and the channels for air and sand, all on an enlarged scale. Fig. 9 is a sectional view of the dust-arrester employed between the dust-flue and exit-flue of the machine. Fig. 10 is a perspective view of a section of the revolving work-holding table. Fig. 11 is a sectional view of the lower sand-reservoir, illustrating the mechanism for controlling the flow of the sand therefrom. Fig. 12 is a view, on an enlarged scale, of the central supporting-column with operating mechanism for revolving the sand-blasts, and their respective sand-reservoirs, with the latter, together with the dust-cylinder, sand-receptacles, and other parts shown in section. Fig. 13 is a plan view taken at line 2 in Fig. 12. Fig. 14 is a plan view taken at line 3 in Fig. 12. Fig. 15 is a plan view taken at line 4 in Fig. 12. Fig. 16 is a plan view taken at line 5 in Fig. 12. Fig. 17 illustrates a removable bar of the revolving table. Fig. 18 is a vertical sectional view of the entire apparatus.

In the drawings, A represents the vertical column which is the main support of the several operating parts of my machine. This column is preferably made of cast-iron in a single piece, though it can be made in sections. Its lower end is provided with a flange $x$, by which it can be secured to the floor.

B is a passage-way made vertically in the column A for the passage of the wind-blast and sand from the pipes H H' to the sand-chamber C, as shown by dotted lines in Figs. 1, 2, 3, and 12, and by full lines in Fig. 5.

Within the sand-receiving chamber C, Figs. 1, 2, 3, 5, and 16, is placed a fine sieve or screen $d$, (shown by full line in Fig. 5,) which screen prevents the passage of sand from the lower portion of chamber C, and at the same time allows the passage of air and dust particles (finer than the sand) to the chimney or exit-flue D from chamber C, and this passage is preferably through opening $d^2$ in hood $d'$. (Shown in Fig. 5.)

E, Figs. 1, 11, and 14, is a stationary sand-reservoir of any suitable construction for containing sand, and access is had to the chamber of the same through a suitable opening made in its side wall and covered by door $h$. (Shown in Fig. 1.) At the bottom of this sand-reservoir is a passage-way $h'$, provided with a suitable valve $h^2$. (Shown in Figs. 11 and 14.) This valve can be operated at will by the rod $h^3$, Fig. 11. In one edge of this rod $h^3$ is provided a series of teeth, any one of which is calculated to engage with an edge portion of the wall of the reservoir to hold the rod at the place moved to, and when this rod is pulled outwardly the valve $h^2$ will be opened, and a reverse movement of the same will close it or move it toward a closing position. The passage $h'$ leads from the bottom of sand-reservoir E to pipe H, Fig. 11.

E' is a rotary sand vessel or receptacle, which is mounted by suitable bearings on a bracket from column A, as shown in Figs. 1 and 12. The particular kind of bearing I prefer to employ with this rotary sand-receptacle is shown in Figs. 1 and 12, and which consists in the essential parts thereof of the solid sprocket-wheel $g$, suitably connected with the lower end of the said receptacle, circular groove 4 in the upper side of supporting-bracket $x^2$, a corresponding circular groove 5, in the lower side of sprocket-wheel $g$, and a series of metallic spheres or balls 6, in said grooves 4 and 5, as shown in Figs. 1 and 12, and a series of vertical cylinders 3, between the hub of the sprocket-wheel $g$ and the opening in bracket $x^2$, receiving said hub, as shown in Fig. 13. By means of the above-described bearing I obviate the use of lubricants for making the sand-receptacle revolve easily and without being affected by sand or grit, which will readily pass down and find its way out between the vertical cylinders 3.

J is a circular gutter around the lower end of the rotary sand-receptacle E', and $jj$ are overflow-pipes leading from the interior of said receptacle to the said gutter. This gutter J is made stationary by being suitably attached to bracket $x^2$, and it is made to have communication with the pipe H' by the short pipes $j^2$, Figs. 1 and 12.

Pipe H connects blast-pipe F with the wind and sand passage B, and pipe H' connects the blast-pipe $F^3$ with the same sand and air passage-way B, and Y is a suitable blowing device, which when operated forces a current of air through both of said pipes F and $F^3$ into their respectively-connected air and sand pipes H H', and the common air and sand passage B in column A. This sand-reservoir E and rotary sand-receptacle E' are arranged beneath the stationary table L and its work-holding table $K^2$, and are supported, respectively, from the brackets $x'$ and $x^2$, Fig. 1.

The stationary table L consists of a disk, preferably of cast metal and having all around the upturned flange L', and is made with a diameter sufficiently great to extend over the upper open ends of the two sand-receptacles E E'. This table is held from revolving in any suitable manner, and has made in it, over the respective sand-receptacles E and E', openings 2', through which sand can fall into the respective receptacles.

$K^2$ is the work-holding table, made with open-work or with a rack-like form, and is circular in form and with a diameter about corresponding with the diameter of the inside of flange L' of the stationary table L. This work-holding table is rotary in character, and revolves horizontally within the flange L' of table L, and a little above the upper surface of the latter, as shown in Figs. 1, 3, and 12. This revolving table $K^2$ is made in sections, as shown in Figs. 2, 10, and 13. These sections are suitably secured together by bolts or any suitable means passing through holes $n^2$ made in the side pieces of said sections, as shown in Fig. 10. These bars $m$ are made separate and of any suitable hard wood and with any suitable form or shape, as will be found to be best adapted for holding the articles or pieces to be cleaned of sand. The drawings, Fig. 10, show sockets $u^3$ made in the side pieces of the section of this table, and holding the bars $m$. These bars $m$ are shown to be provided on their upper edges with supporting-pins $n\ n$, which project upwardly to a short distance so as to hold the articles or pieces to be operated on to a short distance above the upper edges of the bars $m$, so as to expose as much as may be possible of the lower side surface of the articles or pieces to a blast of sand delivered from the lower side of this work-holding table. This revolving table is provided with a central hub K', suitably perforated and mounted on a suitable bearing on column A, as shown, and is supported by a series of metallic balls $l$, rolling in a circular groove made in the upper edge of the fixed collar K, secured to the column just below the hub K' of the said revolving table. If preferred, a flanged collar can be cast with said column.

A portion of hub K' is projected above the plane of the upper side surface of table $K^2$, and has made in its upper edge suitable cogs or teeth for engagement with suitable gear of any known kind for actuating this revolving table and revolving the same with any preferred speed as will be best adapted to carry the pieces to and from the blast operating with the same. The drawings show a worm-gear employed to give motion to this table. This worm-gear is shown by enlarged views in Figs. 6, 7, 12, and 13, and consists of the worm $p$ on the vertical driving-shaft S, working-gear $p'$ and worm $o$ on shaft $q^2$, carrying gear $p'$ and working with the teeth $s$, made on the upper end of hub K' of the revolving table $K^2$.

M M' are cylinders which contain dust-chambers. These cylinders can be made of any suitable material—wood or metal, or both combined—and are arranged directly over the sand-receptacles E E', respectively, as shown, and at a short distance above the revolving table $K^2$, and have their lower ends open to the table below and their upper ends closed by heads N N', respectively, and are supported in a secure and fixed manner by suitable brackets connecting these cylinders to the column A. The lower edges of these dust-cylinders are about from ten to twelve inches above the upper side of table $K^2$, and their length is supplemented by suitable flexible curtains $N^2\ N^2$, Figs. 1, 3, and 12, which extend from the lower end portion of said cylinders to the upper surface of the revolving table. These curtains can be made of heavy canvas or sail-cloth, or leather, or other suitnear the lower side of the revolving table K² and is provided all around with an upwardly-turned flange-rim L', which projects upward to, at, or near the plain of the upper surface of the revolving table K². The solid or close portions of this table L lying outside of its apertures L² prevent the sand and dust from falling down on the floor of the room the apparatus is working in, while the rim or flange L' prevents the sand and dust from working out laterally from beneath the revolving table K².

The driving-shaft S, Figs. 1, 6, 7, 12, and 13, is preferably set into a recess made longitudinally in column A, as illustrated in Figs. 6, 7, and 13, and is extended vertically at the side of the same to connect with gear mechanism for revolving the table K² and the sprocket-wheels $b$ and $g$. The gear mechanism driven by this shaft S for revolving the table K² has been hereinbefore described as being a worm-gear mechanism, which I prefer to use because of the low rate of speed attainable and the positive motion this gear imparts without the least liability to any slipping.

Shaft S is driven by a pair of miter-wheels, only one of which can be seen, actuated by a band-pulley T, driven by band S' from any suitable drive-wheel. (Not shown.) $v'$ (shown in dotted lines in Fig. 2) is a sprocket-wheel secured on the upper end portion of shaft S and imparts motion to the sprocket-wheels $b\ b$, Figs. 1, 2, 3, and 13, through the endless sprocket-wheel chains $u$ and $v$, and $u'$ is a second sprocket-wheel on the lower end portion of shaft S, which actuates the sprocket-wheel $g$ by means of the drive-chain $v$.

By the above-described arrangement of driving-gear mechanism the sand-hoppers R R and their connected sand-blast pipes are revolved simultaneously with the sand-receptacle E' and its sand-blast pipe E².

The manner in which the several parts of this apparatus operates is as follows: The blower Y will be revolved from any suitable driving-wheel, (not shown,) and band S' will be driven by any suitable driving-wheel (not shown) to actuate the shaft S, driving the different mechanisms for revolving the work-holding table K² and the respective sand-hoppers, receptacle, and sand-blast pipes. The operators will stand at the sides of the work-holding table at its uncovered portions and place the articles to be operated on in suitable position to have a suitable passage thereby to beneath the dust-cylinders and out therefrom when they will be removed. A suitable quantity of dried and clean sand will be placed within the sand-supply chamber C, when the apparatus will be ready for operation with the articles operated on. Sand will be delivered from the sand-supply chamber C into hoppers R through the pipe or pipes $c$, and the said hoppers R will be revolved by means of the driving-chains and sprocket-wheels shown, when the sand in said hoppers will be made to flow into the sand-channels $p^2$ of the respective sand-blast pipes P at the same time the air-blower Y is operating to force suitable currents of air through air-pipes F' F² into the air-channels $p^3$ of the respective sand-blast pipes P. In the progress of the sand and air through their respective channels in said sand-blast pipes to the discharge ends of the same the sand and air will become mingled together just before their discharge from said pipes, and under the force of the blower Y this mingled sand and air will be projected with considerable force from the discharge ends of the respective pipes P on the surface of the articles moving below and carried by the revolving table K². The dust-cylinders M M' operate to prevent the mingled sand and air from the sand-blast pipes P from spreading outwardly beyond the circumferential line of the apertures L² in the lower table L, and so confines the mingled air and sand that they will not escape laterally after striking on the article operated on to the discomfort of the operator. The curtains N² operate to supplement the vertical length of the walls of the dust-cylinders and allow the passage of the articles carried by the moving table to beneath the discharge ends of the sand-blast pipes P and from the same in a progressive manner. The sand discharged from the sand-blast pipe P, together with the particles removed by the sand from the articles operated on, will fall through the numerous openings in the revolving table K² and the apertures L² in the stationary table L, partly into the sand-reservoir I and partly into the sand-receptacle E', and the sand caught by the reservoir I will have passage through the passage-way $i$ into the lower sand-blast pipe E² and will be projected upwardly with considerable force against the lower side surfaces of the articles operated on by the action of the air-current forced through the air-channel in said pipe and received through the air-blast F³ from the blower Y, and the sand from the discharge end of this pipe E' will in its main portion, after operating on the lower side surfaces of the articles, fall into the sand-receptacle below to escape therefrom by the means provided. The sand-blast pipes P and E² are each shown to be made with an ogee form of curve, so that their respective discharge ends are made to be set off at a distance from their respective centers of motion and so that the blast of mingled sand and air will be discharged substantially toward each other and simultaneously on the articles and with about the same force on the opposite sides thereof. By this simultaneous action of the two blasts on the articles at points directly opposite each other the lower sand-blast is prevented from lifting the articles on the moving table or from shifting the same; and by this set-off of the discharge ends of these pipes and their revolution about their centers of motion the sand will be delivered from each discharge end in lines of direction which will be substantially across or transverse to the line of direction of movement of the articles subjected to the sand-blasts. By the joint operation of the moving table K² and the movement of the blast-pipes P the articles operated on will have their surfaces about uniformly acted on with the sand projected on their surfaces in lines relatively back and forth across the same as the articles are progressively carried forward below the sand-blast pipes P or between one of said pipes and the sand-blast pipe E².

By giving to the sand-reservoir I a revolving movement in a horizontal direction simultaneously with the sand-blast pipe E² the sand discharged from said pipe will escape thence through the pipes $j$ into the circular gutter J and will be led therefrom through an escape-pipe $j^2$ into the pipe H′, when the air-current, driven by blower Y through pipe F³, will drive the sand entering pipe H′ from the circular gutter above into the passage-way B $a$ and from thence into the sand-supply chamber C.

The sand discharged from the sand-blast pipe P, operating within the dust-cylinder M, will fall through the openings in the revolving table K² and the aperture in the stationary table L into the sand-reservoir E, from whence it, together with the particles removed from the articles operated on, will be permitted to pass through the valve at the bottom of said reservoir into the pipe H, from whence this sand and dust will be driven into the passage-way B $a$ and to the sand-supply chamber C by the force of the air-current through pipe F from the blower Y. This sand-reservoir E operates, also, as a sand-supply vessel, into which a sufficient quantity of sand can be placed and be transferred to the sand-supply chamber C above before active operations of the sand-blasts with the articles are commenced, and the sand can be introduced into said reservoir through door $h$, and by the force of the air-current through pipe F from the blower and into the pipe H and way B $a$ this sand will be transferred to the supply-chamber C in a rapid and convenient manner. I prefer to use this means for introducing sand into this chamber C because its height above the floor in a large working machine is nearly eight feet, and therefore not conveniently accessible.

While this apparatus is in operation the blower Y will drive a continuous current of air through each of the pipes F F³ into the pipes H H′, respectively, and carry before it the sand and dust escaping from reservoir E and receptacle E′, and will carry this sand and dust together into the chamber C through the passage B $a$ in the column A, and this mingled sand and dust will be discharged from passage-way $a$ into the upper portion of said chamber and just below the plane of the screen $d$. This screen prevents the passage of the particles of sand into the flue $w'$ above and allows the particles of dust, mingled with the sand, to readily pass through its meshes into said flue, so that the latter will be readily separated from the former and be in condition for reuse, and will fall into the lower portion of the chamber C to have a second passage therefrom through pipes $c\ c$.

The bellows W supplements the blower Y in driving the dust from flue $w'$ into the larger flue D and dust-receptacle Z. At the same time this bellows W operates to draw from the dust-cylinders M M′ the lighter particles of dust from the articles operated on. As the fans $t^6\ t^7$ are operated in a vibratory manner, the dust and air from the said dust-cylinders M M′ will be drawn into passage W³ and be thence drawn alternately into the chambers W′ W² through their respective valves $w^3$, and be forced thence into the outlet-passage W⁴ through the respective valves $w^2$, the valves $t^8$ and $t^9$ in the same time operating one to admit the passage of the dust and air from the inlet-passage W³ into one of the chambers—as chamber W′—and the other to permit the passage of air from the other chamber W² into the outlet-passage W⁴. The mingled dust and air forced by this bellows W into the flue D is carried by the operations of the same into the dust-receptacle Z, and striking the deflecting-plate Z′ they will together be deflected on the water Z² in said receptacle, when the dust will sink into the water, while the air will turn upwardly at the edges of this deflecting-plate and escape into the flue D′ and pass thence to a suitable exit. An opening in a side of this receptacle and closed by a door (not shown) can be provided for convenience in removal of the accumulations within.

The dust-cylinders M M′ are shown to be cylindrical in form, yet they can be made square or with any other suitable form. The drawings show the hoppers R to be revolved by sprocket-wheels and endless chains, yet they can be revolved by any suitable system or train of gear-wheels selected to be used.

The drawings show the revolving table K² to have its open-work article-holding portions to be made in the form of straight bars, yet they can be made with any other form preferred. In practice I preferably make these bars of hard wood and with a form substantially shown in Fig. 17, in which in the side elevation the bar is made to be straight on one edge and free from any projection, while the opposite edge is made with a reduced width between its ends and provided with projecting pins. With this form of construction these bars can be made to have their edges reversed at will in the table, so as to have the pins to project upward, or so that the plain straight edge be upward, accordingly as will be most suitable for giving best support to the articles, and by making these bars removable by the employment of sockets $u^3\ u^3$, as shown in Figs. 10 and 13, they can be readily renewed from time to time as they become worn by the action of the sand-blasts.

By the employment of steam through the pipes G G' in with air from the blower, the sand will be projected more forcibly from the sand-blast pipes, which is of great advantage in some cases, especially where the material operated on is very hard or the reduction of the surface is to be considerable, and in some cases I prefer to use heated air, especially in cold weather, so that no moisture will be deposited on the articles, or with the sand when steam is employed. By a suitable valve in the steam-blast pipes G G' the operator can at will increase or vary the force of the sand-blast from time to time, as the nature of the articles or the material may require.

The ball and cylinder form of bearings for the journals of the revolving reservoirs permits those devices to be revolved with a considerable speed without the use of lubricants and permits the dust and sand from any cause entering the same to readily escape therefrom without any perceptible wear to the parts.

It should be understood that though the drawings show the sand-blast pipes P and E² to be of an ogee curved form, yet they can be of any other selected form—such, say, as angular—so long as their discharge ends are made to set out from a line coincident with the line of axis of motion of the said pipes.

I have in my application, Serial No. 285,348, filed September 13, 1888, described a process for dressing, cutting, and cleaning stone, &c., to carry out which I provide an apparatus which contains as essential elements a moving table for supporting the articles to be operated upon, a sand-supply receptacle at an elevation above the table, sand-hoppers to supply sand to the sand-blast pipes, a blower for forcing currents of air into the sand-blast pipes, sand-blast pipes which have their discharge ends moved alternately back and forth substantially across the line of movement of the table, upper sand-blast pipes which have their discharge ends directed toward each other, and are simultaneously moved relatively across the line of the movement of the articles to be operated upon, receptacles for receiving the used sand and dust particles, means for cleaning the sand from foreign dust particles, and means for returning the used sand to the sand-supply receptacle above the table for re-supplying the sand-blast pipes; and I do not herein claim said process nor the apparatus by which said process is carried into effect.

Having described my invention, what I claim, and desire to secure by Letters Patent, is—

1. In a sand-blast apparatus, the combination, with a blower, a sand-reservoir, and a table for holding the articles to be operated upon, of a gyratory sand-blast pipe provided with an interior air-blast channel connected with an air-blast pipe, and a sand-channel connected with the sand-reservoir, substantially as specified.

2. In a sand-blast apparatus, the combination, with a blower, a sand-reservoir, and a moving table for holding and carrying in a circular direction the articles to be operated upon by the sand-blast, of a gyrating sand-blast pipe provided with an internal air-blast channel connected to an air-blast pipe, and a sand-channel connected with a sand-reservoir, the said sand-blast pipe having a gyratory movement over the said table at the time it is being revolved, substantially as specified.

3. In a sand-blast apparatus, the combination, with a blower and a table calculated to hold the articles to be operated upon, of a revolving sand-reservoir and a sand-blast pipe, which receives sand from said reservoir and air from an air-blast pipe, and which has one end connected with the said sand-reservoir at its axis, and its discharge end set off from a line drawn vertically through the axis of said sand-reservoir, substantially as and for the purposes set forth.

4. In a sand-blast apparatus, the combination, with the sand-reservoir and blower, and an open-work moving table which is calculated to expose the opposite sides of articles to be operated upon, of two rotary sand-blast pipes, which are oppositely located in relation to said table and have their discharge ends facing each other, with one relatively above the plane of the upper surface of said table and the other below the plane of the lower surface of the table, and both gyratory in unison about their respective axes of motion, substantially as and for the purposes set forth.

5. In a sand-blast apparatus, the combination, with the sand-reservoir and blower and open-work table which is calculated to hold articles operated upon with both sides exposed and carry the same progressively in one direction, of two sand-blast pipes, which are oppositely located in relation to the said table and have their discharge ends facing each other, with one relatively above and the other relatively below the plane of the upper side surface of said table and revolve simultaneously with the same speed and in the same direction about their respective axes of motion, substantially as and for the purposes set forth.

6. In a sand-blast apparatus, the combination, with the blower and means, substantially as described, for supplying sand to the reservoir below the table, a sand-blast pipe, which is inclosed within a dust-cylinder located above a moving table calculated to carry the articles operated upon beneath the discharge end of said pipe and thence from the same, and a sand-receptacle having its upper end facing the lower end of the dust-cylinder and its lower end provided with a sand-escape pipe, of a sand reservoir located within the open upper end of said sand-receptacle and having a passage-way from it to a sand-blast pipe which has its discharge end below the plane of the upper surface of said open-work table, substantially as and for the purposes and operations set forth.

7. In a sand-blast apparatus, the combination, with an open-work table, which is calculated to hold articles to be operated upon with their lower side surfaces exposed, of a rotary or gyratory sand-blast pipe having its discharge end facing the lower side surfaces of said table, a blower, and a sand-reservoir having a passage-way between it and said sand-blast pipe, and an air-blast pipe which communicates from an air-blower to the said sand-blast pipe, substantially as and for the purposes set forth.

8. In a sand-blast apparatus, the combination, with an open-work table for holding the articles to be operated upon, and a sand-blast pipe provided with a sand-supply receptacle C, which receives sand from above, of a stationary circular gutter, substantially as and for the purposes set forth.

9. In a sand-blast apparatus, the combination, with the sand-containing chamber C, provided with discharge-pipe $c$, of the revolving sand-hopper, having a sand-blast pipe communicating with its interior and extended from its lower end portion into a dust-cylinder located above an open-work table, a revolving sand-receptacle, a stationary circular gutter around its lower portion, a passage-way leading from the chamber of said receptacle into said gutter, a blower, an outlet-pipe leading from said gutter to a pipe which receives a blast of air from the blower and discharges it, together with the sand from the gutter, into a passage-way for the return of the sand to the said sand-containing chamber C, substantially as and for the purposes set forth.

10. In a sand-blast apparatus, the combination, with a sand-chamber C, a sand-blast pipe $F^3$, and an open-work table for holding the articles to be operated upon, of a sand-receptacle E', means, substantially as described, for the passage of the sand from said sand-receptacle to a channel receiving a blast of air from a blower, and the blower connected with said sand-blast pipe, substantially as specified.

11. In a sand-blast apparatus, the combination, with the sand-receiving chamber C and channels B $a$, of a sand-receptacle having a sand-valve which is operated and adjusted at will, the pipe H, receiving sand from said receptacle through said valve and air from a blower connecting with said pipe H, said pipe H connecting also with the channel B, substantially as and for the purposes set forth.

12. In a sand-blast apparatus, the combination, with the sand-chamber C and a passage-way conveying air mingled with sand and dust from the articles operated upon, and the blower and blast-pipes that convey the sand and dust through the passage-way, of a dust-flue and a bellows to force a current of air into said dust-flue and to an exit, substantially as and for the purposes set forth.

13. In a sand-blast apparatus, the combination, with a flue $m^2$, which connects with a dust-cylinder, and a flue $m'$, which connects with a dust-flue leading to an exit, of the bellows W, comprised of two chambers inclosed within a casing and separated by a diaphragm and situated between an inlet-passage at one side from the flue leading from the dust-chamber and at the other side an outlet-passage leading to the dust-flue which leads to the exit-flue, valves in said diaphragm, and oscillating fans within said chambers and provided each with a valve, substantially as and for the purposes set forth.

14. In a sand-blast apparatus, the combination, with an air-blast pipe leading to a sand-blast pipe, of a steam-pipe supplied with steam from any suitable steam-generator, substantially as and for the purposes set forth.

15. In a sand-blast apparatus, the combination, with a revolving sand-blast pipe, an open-work table, and the blower, of a stationary table having an opening, which is relatively below the said sand-blast pipe and leading to a sand-receptacle below, substantially as and for the purposes set forth.

16. In a sand-blast apparatus, the combination, with a revolving open-work table, a blower, and a sand-blast pipe which is located above said table, and a second sand-blast pipe located below the same, of a stationary table having an opening, which is located relatively opposite to the discharge ends of both said sand-blast-pipes, substantially as and for the purposes set forth.

17. In a sand-blast apparatus, the combination, with a frame of the machine of a sand receptacle or hopper for supplying sand to a revolving sand-blast pipe, of a sprocket-wheel and chain for revolving the same, and a series of balls rolling in a ring form, horizontal groove in the bearing, and a series of cylinders arranged vertically in an annular chamber between the journal of the receptacle or hopper and the bearing, substantially as and for the purposes set forth.

18. In a sand-blast apparatus, the combination, with a work-holding table, of work-supporting-slats, which are made to have one edge beveled and the opposite edge provided with studs or pins for operation, substantially as and for the purposes set forth.

In testimony whereof I affix my signature in presence of two witnesses.

JOHN H. GOODFELLOW.

Witnesses:
GEO. C. MILLER,
C. S. GOODFELLOW.

(No Model.)
J. R. GRAY.
SUPPORT FOR SPINNING SPINDLES.
No. 437,923. Patented Oct. 7, 1890.
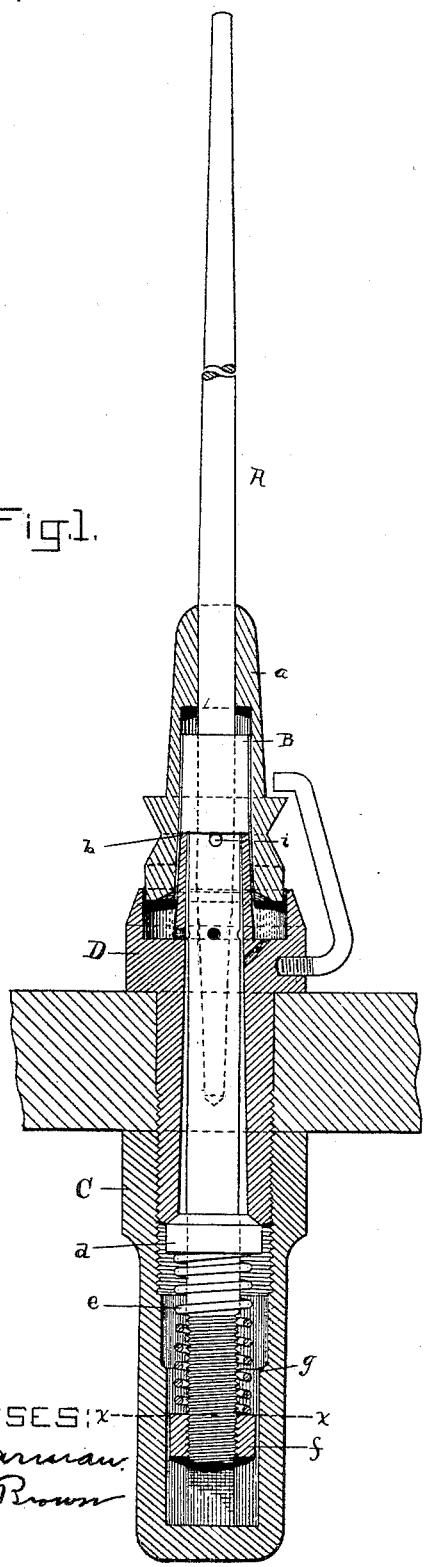
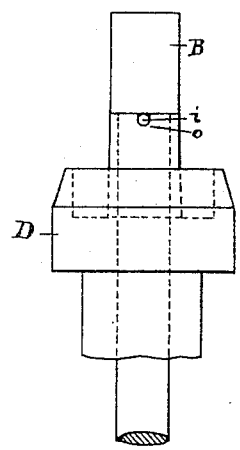
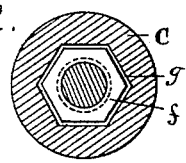
WITNESSES:
L. A. Carman
William Brown
INVENTOR,
James R. Gray